Jan. 17, 1956  W. L. CHURCH  2,731,315
PISTON WITH MEANS FOR REMOVING SAME FROM ROD
Filed Oct. 29, 1951
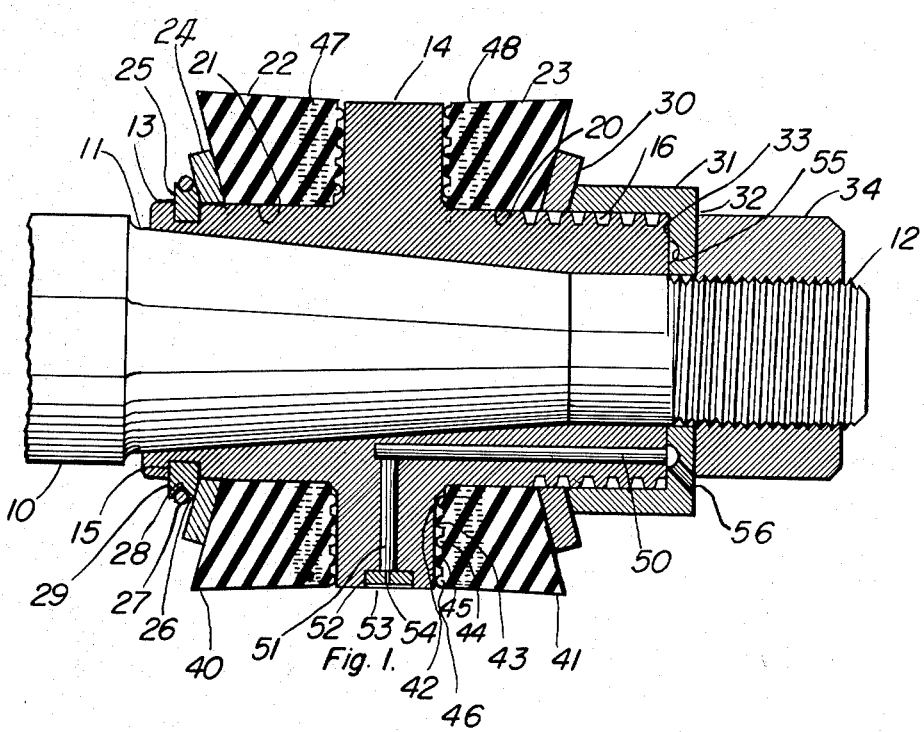
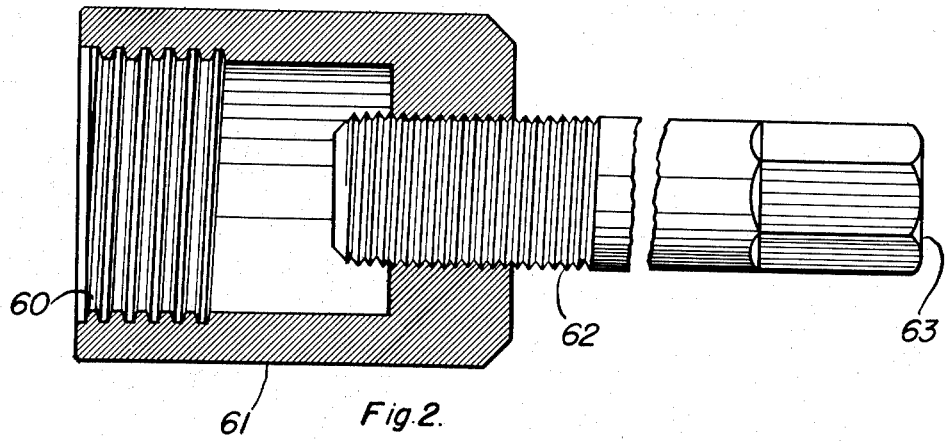
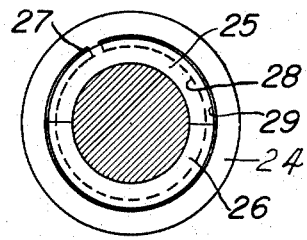
Walter L. Church INVENTOR.
BY Murray Robinson
Attorney.

United States Patent Office 2,731,315
Patented Jan. 17, 1956

2,731,315

PISTON WITH MEANS FOR REMOVING SAME FROM ROD

Walter L. Church, Houston, Tex., assignor to Pioneer Specialties, Inc., Houston, Tex., a corporation of Texas Application October 29, 1951, Serial No. 253,703

9 Claims. (Cl. 309—23)

This invention pertains to pistons and more particularly to a piston having a lubricated replaceable head and replaceable seal rings for use in a mud or slush pump used in connection with petroleum well drilling apparatus. It is an improvement upon and modification of the invention set forth in my prior copending application S. N. 228,072 filed May 24, 1951, now abandoned, entitled "Piston" of which application this application is a continuation-in-part.

The principal object of this invention is to reduce the rate of wear of the piston rings.

A further object of the invention is to reduce the rate of wear of the cylinder associated with the piston.

Another object of the invention is to provide a secure attachment of the piston rings to the piston head.

Another prime object of the invention is to seal the piston rings to the piston head.

Another object of the invention is to provide a piston head having piston rings that can be replaced without removing the piston rod from the pump cylinder or disconnecting it from the drive means.

Another object of the invention is to provide a piston having a replaceable head that is securely attached to the piston rod.

A further object of the invention is to provide a piston that will seal tightly to the cylinder in which it works.

Other objects and advantages of the invention will become apparent from the following description of a preferred embodiment thereof, reference being made to the accompanying drawing in which:

Figure 1 is an axial section through the piston;

Figure 2 is an axial section through a tool used for pulling the piston head off the piston ring;

Figure 3 is a plan view of the split collar and lock ring used to hold the inner piston ring in place on the piston head.

Referring first to Figure 1, there is shown a piston rod 10 having a conical portion 11 near one end and a cylindrical partially threaded portion 12 at the reduced end. A piston head 13 having an internal opening that is conical at one end and cylindrical at the other correlative to the conical and cylindrical portions 11 and 12 of the piston rod is in tight engagement with the piston rod. The head 11 has a radial annular backing flange 14 near its midsection. At one end of the head there is an annular groove 15 and at the other there is a coarse thread 16.

Disposed over the cylindrical outer portions 20, 21 of the piston head adjacent flange 14 are piston rings 22, 23 of neoprene or other oil resistant rubber-like material. Ring 22 is pressed axially against flange 14 by a collar 24 held in place by a split collar 29 whose segments 25, 26 (see Figure 3) are disposed in groove 15 and locked in place by snap ring 27 disposed in an annular groove 28 in collar 29. The collar segments and the groove take the load on the piston ring, which is axial, the snap ring being merely a locking device.

Ring 23 is pressed axially against flange 14 by a solid collar 30 which in turn is held by apertured cap 31 slipped over the end of the piston rod. The inturned portion 32 of the cap also bears against the end 33 of the piston head to hold it on the piston rod, the cap 31 being secured by a nut 34 screwed on to the piston rod. Cap 31 also serves to protect thread 16.

Rings 22 and 23 have lip portions 40, 41 which are of larger diameter than the remainder of the rings, these lip portions being distorted inwardly when the piston is inside a cylinder, thereby biasing them against the cylinder wall to assure a seal.

The inner end faces of rings 22, 23 are provided with a series of concentric, spaced apart, annular ribs such as those shown at 42—46 on ring 23. These ribs prevent leakage between the piston head and piston rings. In order to stiffen the rings adjacent the ribs they can be reinforced with canvas or leather lamination rings as indicated at 47, 48.

The piston head is provided with an axial passage 50 communicating with a radial passage 51. An enlarged opening 52 at the outer end of passage 51 provides a seat in which is secured a carbide orifice bushing 53 having a small opening 54 therethrough. The cap 31 has an annular groove 55 on its inner face which communicates with passage 50. One or more passages such as 56 through the cap 31 communicate with groove 55. By this means fluid at the end of the piston will flow into the annular space between the lips 40, 41 and the cylinder wall whenever the piston moves against the fluid. This lubricates the outer peripheries of the rings between the lips and prevents the rings from sticking to the cylinder wall, and tearing off in large chunks. The orifice bushing provides an aperture that limits the flow into the space between the rings to a predetermined desired amount, and since it is made of hardened material it will resist the wearing action of any abrasive material contained in the fluid passing therethrough and emerging therefrom, so that it will remain substantially the same size for a long time, after which it can easily be replaced. The laminated structure of the rings at 47, 48, also serves to inhibit such destruction of the piston rings. The lubrication between the lips also reduces wear on the cylinder wall.

When it is desired to replace the piston rings after they have become worn, the nut 34 is unscrewed, cap 31 and collar 30 removed, and ring 23 slipped off the piston head. Then the thread 60 of the pulling tool 61 shown in Figure 2 is screwed onto the thread 16 of the piston head and screw 62 tightened against the end of the piston rod. A hammer blow on head 63 of the screw releases the piston head from its taper fit on the piston rod and the head is then removed. By releasing snap ring 27, the split collar segments 25, 26 can be taken out of groove 15 and the ring 22 slipped off. New piston rings are substituted and the piston reassembled.

While a preferred embodiment of the invention has been shown and described, many modifications thereof can be made by one skilled in the art without departing from the spirit of the invention and it is intended to protect by Letters Patent all forms of the invention falling within the scope of the following claims.

I claim:

1. A piston comprising a piston rod having a conical portion near one end, a piston head having a conical opening fitting tightly on the conical portion of the piston rod, said piston head having an annular radial flange near its midsection, a pair of piston rings disposed over the ends of the piston head and held against said flange, a coarse thread around the end of said head having the smaller diameter opening, a solid collar disposed over said end adjacent one of said piston rings, an apertured cap disposed over the end of the piston rod and having a sleeve portion covering said thread and bearing at its end against said solid collar and having a radially inturned portion bearing against said end of the piston head, and means to secure said cap on said rod against axial displacement.

2. A piston comprising a piston rod having a conical portion near one end, a piston head having a conical opening fitting tightly on the conical portion of the piston rod, said piston head having an annular radial flange near its midsection, a pair of piston rings disposed over the ends of the piston head and held against said flange, each of said rings having an annular lip on its outer periphery, a passage through said head from one end thereof to the outer periphery of said flange, a coarse thread around the end of said head having the smaller diameter opening, a solid collar disposed over said end adjacent one of said piston rings, an apertured cap disposed over the end of the piston rod and having a sleeve portion covering said thread and bearing at its end against said solid collar and having a radially inturned portion bearing against said end of the piston head, and means to secure said cap on said rod against axial displacement, said cap having an annular groove in its inturned radial portion on the face thereof adjacent the end of the head, said groove communicating with said passage in the head, said cap having at least one opening therethrough from said groove to the exterior of the cap.

3. A piston comprising a piston rod having a conical portion near one end, a piston head having a conical opening fitting tightly on the conical portion of the piston rod, said piston head having an annular radial flange near its midsection, a pair of piston rings disposed over the ends of the piston head and held against said flange, each of said rings having an annular lip on its outer periphery, a passage through said head from one end thereof to the outer periphery of said flange, a bushing of hard material disposed in said passage, said bushing having an orifice of smaller diameter than said passage, a course thread around the end of said head having the smaller diameter opening, a solid collar disposed over said end adjacent one of said piston rings, an apertured cap disposed over the end of the piston rod and having a sleeve portion covering said thread and bearing at its end against said solid collar and having a radially inturned portion bearing against said end of the piston head, means to secure said cap on said rod against axial displacement, said cap having an annular groove in its inturned radial portion on the face thereof adjacent the end of the head, said groove communicating with said passage in the head, said cap having at least one opening therethrough from said groove to the exterior of the cap, an annular groove around said head at the end thereof having the larger diameter opening, a plurality of collar segments in said groove, a collar between said collar segments and the other one of said piston rings, said segments having an annular groove therearound, and a snap ring in the last said groove.

4. A piston body comprising a piston head having a conical opening therethrough adapted to fit tightly on the conical end portion of a piston rod, said piston head having an annular radial flange near its midsection, a piston ring disposed over the one end of said head having the larger diameter opening, a collar secured to said one end holding said ring against said flange, a second piston ring disposed over the other end of said head, a second collar disposed over said other end to hold said second ring against said flange, said other end having a part extending axially beyond said second ring and said second collar, said part being provided with means for engaging a pulling tool, a cap having a sleeve portion covering said extending part of said head and said means and bearing at its end against said second collar, said cap having a radially inturned portion bearing against said other end of the piston head, said inturned portion being apertured to provide a passageway for the end of said piston rod to extend therethrough to engage means for securing said cap thereon against axial displacement.

5. A piston comprising a piston rod having a conical portion near one end, a piston head having a conical opening fitting tightly on the conical portion of the piston rod, said piston having an annular radial flange near its midsection, a pair of piston rings disposed over the ends of the piston head disposed in engagement with said flange, the end of said head having the smaller diameter opening incuding a portion extending axially beyond the ring at that end, said portion having means thereon to engage a pulling tool, said portion being connected through said head to said flange and rings whereby when a pull is taken on said portion it pulls on both of said rings and flange to remove them from the rod together with the rest of the head, and means independent of the first said means for holding said rings in engagement with said flange and for holding said head on said rod.

6. A piston body to be used in conjunction with a piston rod having a conical portion near one end comprising a piston head having a conical opening adapted to fit tightly on the conical portion of said piston rod, said piston head having an annular radial flange near its midsection, a pair of piston rings disposed over the ends of the piston head, means to hold said rings against said flange, the end of said head having the smaller diameter opening including a portion extending axially beyond the ring at that end, said portion having means thereon independent of the first said means to engage a pulling tool, said portion being connected through said head to said flange and rings whereby when a pull is taken on said portion it pulls on both of said rings and flange to remove them simultaneously with the rest of the head.

7. A piston body to be used in conjunction with a piston rod having a seat near one end adapted to receive a piston head thereon comprising a piston head having an opening adapted to fit tightly on said piston rod seat, said piston head having an annular radial flange near its midsection, a pair of piston rings disposed over the ends of the piston head, means securing said piston rings to said head against said flange, an end of said head that will be farthest from the other end of said rod when said head is placed thereon including a portion extending axially beyond the ring at that end, said portion having means thereon independent of the first said means to engage a pulling tool, said portion being connected through said head to said flange and rings whereby when a pull is taken on said portion it pulls on both of said rings and flange to remove them simultaneously with the rest of the head.

8. A piston body comprising a piston head having an opening extending axially therethrough, said piston head having an annular radial flange near its midsection, a pair of piston rings disposed over the ends of the piston head, means affixing said piston rings to said head with the rings against said flange, one end of said head including a portion extending axially beyond the ring at that end, said portion having means thereon independent of the first said means to engage a pulling tool, said portion being connected through said head to said flange and rings whereby when a pull is taken on said portion it pulls on both of said rings and flange to move them simultaneously with the rest of the head.

9. A piston body comprising a piston head having an opening extending axially therethrough, said piston head having radially extending means disposed around its outer periphery for supporting annular sealing means against axial movement on said head, annular sealing means disposed on said head including parts at both ends of said head, said sealing means being engaged with said supporting means, one end of said head including a portion extending axially beyond the part of the sealing means at that end, said portion having means thereon independent of said supporting means to engage a pulling tool, said portion being connected through said head to said supporting means and sealing means whereby when a pull is taken on said portion it pulls on both of said supporting means and sealing means to move them simultaneously with the rest of the head.

References Cited in the file of this patent

UNITED STATES PATENTS

| | | |
|---|---|---|
| 1,583,955 | Bull | May 11, 1926 |
| 1,768,633 | Ries | July 1, 1930 |
| 1,818,187 | Bailey | Aug. 11, 1931 |
| 1,949,612 | Mattair | Mar. 6, 1934 |
| 1,955,157 | Wayne | Apr. 17, 1934 |
| 2,064,969 | Carr | Dec. 22, 1936 |
| 2,208,620 | Baisch | July 23, 1940 |
| 2,211,456 | Caldwell | Aug. 13, 1940 |
| 2,216,353 | Park | Oct. 1, 1940 |
| 2,318,757 | Christenson | May 11, 1943 |
| 2,450,693 | Sanders | Oct. 5, 1948 |
| 2,470,541 | Young | May 17, 1949 |
| 2,484,474 | Stock | Oct. 11, 1949 |
| 2,566,994 | Phipps | Sept. 4, 1951 |
| 2,596,703 | Maier | May 13, 1952 |
| 2,597,829 | Stillwagon | May 20, 1952 |